No. 810,149. PATENTED JAN. 16, 1906.
G. C. HORST.
CONVEYER.
APPLICATION FILED NOV. 17, 1902.
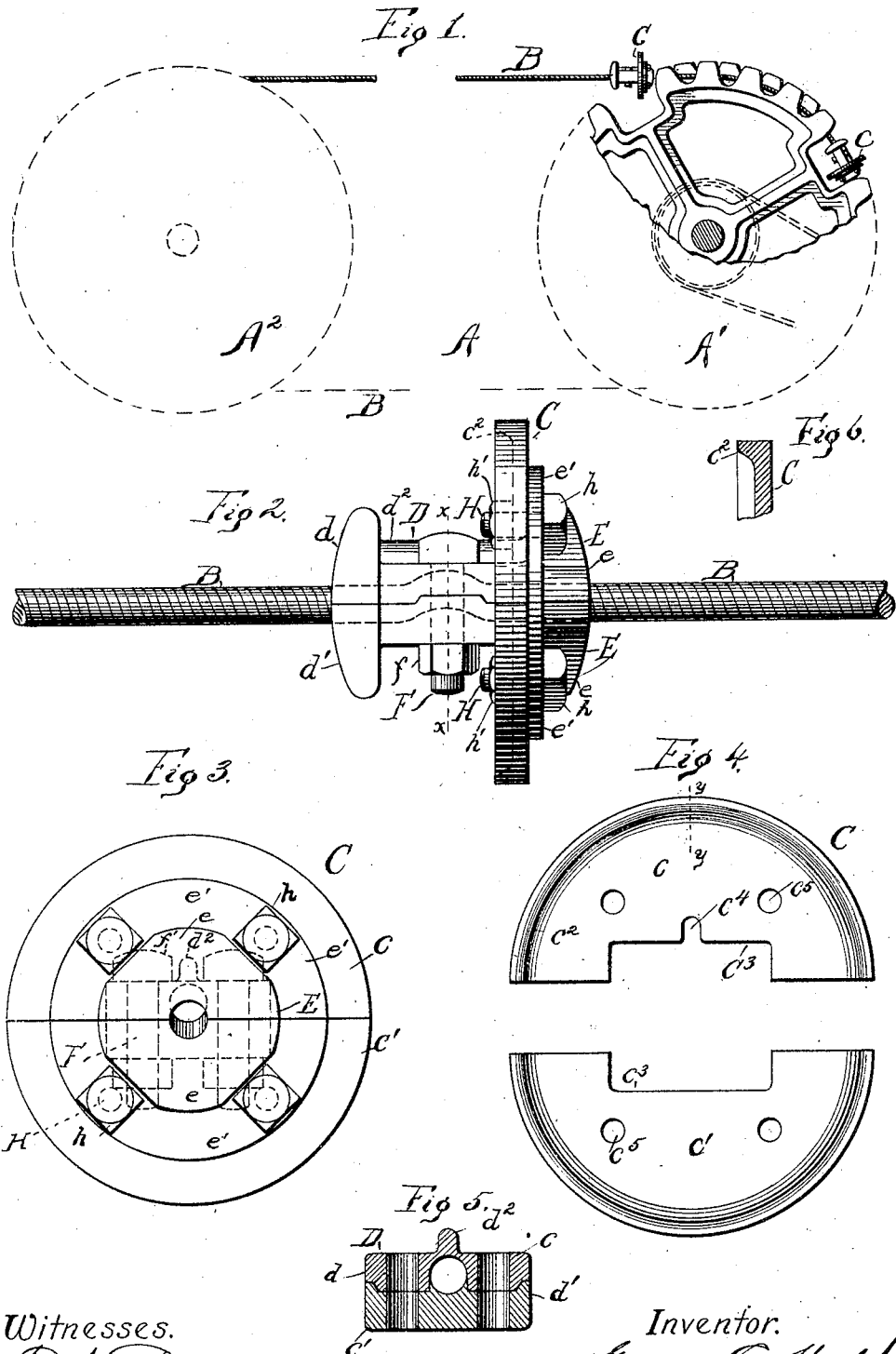
Witnesses.
F. S. Elmore
N. Curtis Lammont
Inventor.
George C. Horst,
By H. H. Bliss,
Atty.

UNITED STATES PATENT OFFICE.

GEORGE C. HORST, OF COLUMBUS, OHIO, ASSIGNOR TO JOSEPH A. JEFFREY, OF COLUMBUS, OHIO.

CONVEYER.

No. 810,149.     Specification of Letters Patent.     Patented Jan. 16, 1906.

Application filed November 17, 1902. Serial No. 131,683.

*To all whom it may concern:*

Be it known that I, GEORGE C. HORST, a citizen of the United States, residing at Columbus, in the county of Franklin and State of Ohio, have invented certain new and useful Improvements in Conveyers, of which the following is a specification, reference being had therein to the accompanying drawings.

This invention relates to improvements in conveyers of the class in which use is made of endless chains, cables, or the like and scrapers or flights secured thereto at intervals and adapted to engage the material which is to be conveyed and drag it along the trough or bottom support.

Figure 1 is a side view of a sufficient portion of a conveyer to illustrate the manner of embodying my improvements, part of the apparatus being shown in dotted lines. Fig. 2 is a side elevation of a section of the conveyer on a larger scale. Fig. 3 is a rear view of one of the flights and its attaching devices. Fig. 4 is a front view of the parts of the flight proper. Fig. 5 is a cross-section on the line $x$ $x$, Fig. 2. Fig. 6 is a section at $y$ $y$, Fig. 4.

In the drawings, A indicates a conveyer as an entirety. As illustrated, it is supported upon wheels at $A'$ $A^2$; but, of course, in such respect there can be modification. The conveyer has one or more endless cables, chains, or the like, as indicated by B, this part of the apparatus here being shown as an endless cable, which for many purposes is preferred.

The flight is indicated as a whole by C. It is formed in two halves $c$ $c'$, preferably separable from each other on the line of one of the diameters. When the parts are together, they constitute a circular plate which is flat upon the rear side and concave upon the forward or operative side, the edge flanged portion being indicated by $c^2$. At the center there is an angular recess $c^3$ and a groove or slot at $c^4$.

The attachment part of the device is indicated as a whole by D. It is formed in two halves, (indicated by $d$ $d'$,) which in some respects are similar to each other, but which differ in others. Each half has at its rear end a boss or hub part E, with a curved rear face $e$, and at the front of the hub there is a semicircular plate $e'$. The half $d$ of the attachment is formed with a bolt-locking rib $d^2$. The two halves are fastened together by the bolts F and nuts $f$. The bolt-heads $f'$ are locked against rotation by the ribs $d^2$, and the nuts $f$ can be turned in either direction without liability of the bolt turning therewith. For the cable B grooves are formed along the inner faces of each of the halves $d$ $d'$ of the attachment, these grooves when the parts are put together forming a passage-way which is curvilinear, as shown by the dotted lines in Fig. 2.

The scraper or flight C is put in place by attaching the halves thereof to the disk parts $e'$ $e'$. The hub of the attachment is square in cross-section, so that the angular aperture $c^3$ can be fitted in place and prevented from turning. The flight is fastened by means of bolts H, which pass through apertures in the disk $e'$ and apertures $c^5$ in the flight. The hub part E is so shaped, as shown in Fig. 3, that the bolt-heads $h$ are thereby locked against rotation, permitting the nuts at $h'$ to be readily drawn tightly or loosened without turning the bolts. The flight C can be put in place and removed without removal of the attachment parts D. In case of breakage repairing can be readily effected, provision being made for the ready taking off of the broken or the worn flight and the attaching of a new one. The removal of the attachments or clamps from the cable is a matter of serious inconvenience because of the trouble and difficulty incident to securing them in a proper position. In the present construction they can be secured in the proper positions quickly and without danger of throwing the cable or chain and its flights out of proper pitch relations with the wheels.

It will be noted that the clamp D has either end enlarged and convexly curved. This construction of clamp permits of the travel of the cable in either direction about the head-wheels of the conveyer system, the convex ends of the said clamp being adapted to engage with the teeth of the sprocket-wheel irrespective of the axial condition of the flight, so as to prevent the flight or scraper from coming into contact with the said teeth.

I am aware that it has heretofore been proposed to construct a clamp for a cable in two parts, the ends of said clamp being convexly curved; but I believe that I am first to devise an attachment and flight for a cable conveyer having a two-part clamp, the ends of which are convexly curved and a flight detachably secured to said clamp between its ends.

What I claim is—

1. The herein-described attachment and flight for a conveyer, it having the clamp or attachment formed in halves adapted to be clamped together and to form a bend of the cable therein, in combination with a detachable scraper or flight, and detachable means for securing the scraper or flight to the attachment, and means independent of the fastening devices for locking the flight against rotation on the attachment, substantially as set forth.

2. The herein-described attachment and flight for a conveyer, it having the two separable halves adapted to be clamped to a cable or chain, said halves being formed with the curved-surfaced hub E at the rear end and the disk $e'$ in combination with the detachable flight C formed in sections and adapted to be placed around the two parts of the attachment, and means for clamping the flight to the disk $e'$ independently of the cable, substantially as set forth.

3. The herein-described attachment and flight for a conveyer, it comprising the clamp D formed in two halves adapted to be clamped to the cable or chain and having the flange $e'$ arranged between the ends of the clamp and the two-part flight adapted to be placed around said clamp and to be detachably secured to said flange thereon, substantially as set forth.

4. The herein-described attachment and flight for a conveyer, it comprising the clamp or attachment formed in halves and adapted to be clamped to the cable or chain, said halves being formed with a flange $e'$ and the rear hub part E, the flight formed in sections and adapted to be placed around the attachment and the bolts for detachably securing said flight to the flange $e'$, the hub part E being so shaped as to engage with the heads of the bolts and prevent them from turning when the flight is secured in place, substantially as set forth.

5. In a flight-conveyer, the combination of a two-part attachment adapted to be clamped to the cable or chain said halves being formed with a flange $e'$ and one of them having a rib $d^2$, and the two-part flight, fitted around said attachment and secured to said flange and having a recess adapted to receive said rib and to lock the flight against rotation independently of its fastening devices, substantially as set forth.

6. The herein-described attachment and flight for a conveyer, it comprising the clamp D formed of two halves adapted to be clamped to the cable or chain and having the enlarged convexly-curved ends for engaging with the teeth of a sprocket-wheel and the flange arranged between said ends, and the flight placed around said clamp and secured to the said flange, substantially as set forth.

7. In a cable conveyer the combination with the flexible cable, and a detachable laterally-extending circular flight or scraper surrounding said cable, of the attachment-clamp formed in two parts separable on a line longitudinally of the cable and detachably connected to the flight or scraper, the clamp having a convexly-faced enlargement or head at one side of the flight or scraper and one on the other side and both adapted to engage with the teeth of a sprocket-wheel irrespective of the axial position of the flight and adapted to relieve the flight or scraper of strains or pressure from the wheel, substantially as set forth.

In testimony whereof I affix my signature in presence of two witnesses.

GEORGE C. HORST.

Witnesses:
CHAS. W. MILLER,
ALICE PRICE.